A. E. BRAY.
CLAMP.
APPLICATION FILED MAR. 5, 1913.
1,083,482.
Patented Jan. 6, 1914.
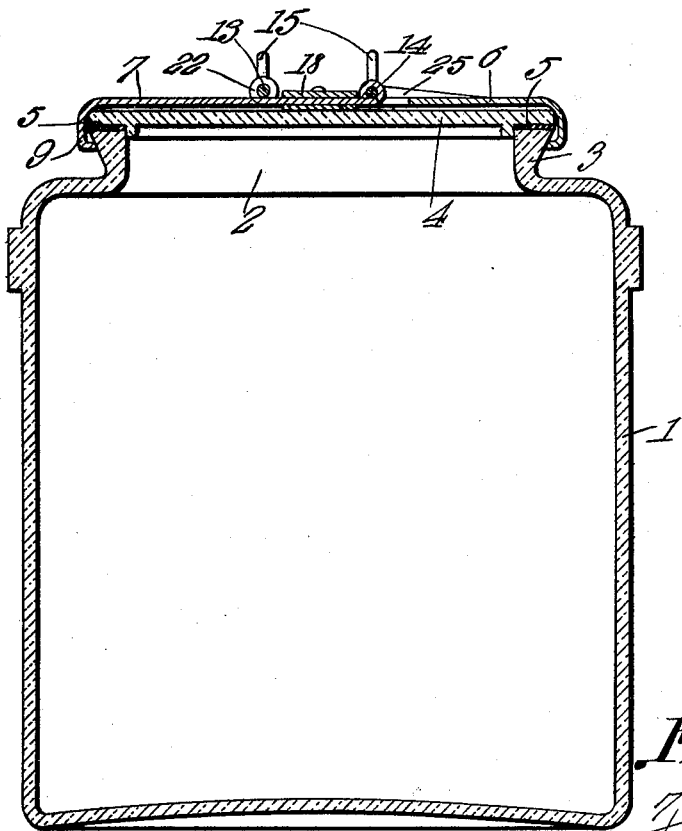
Fig.1.
Fig.3.
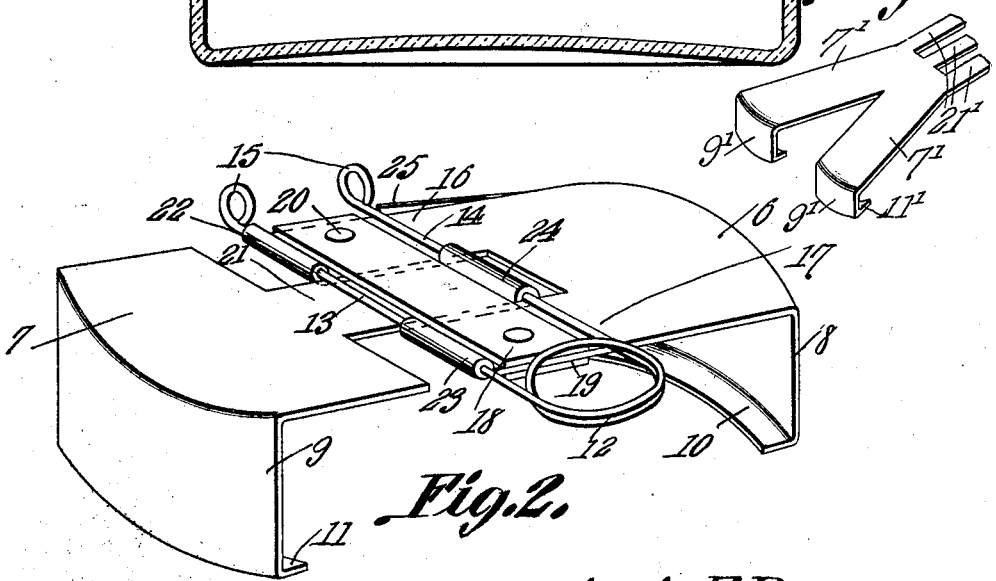
Fig.2.
Witnesses
Annie E. Bray, Inventor
by C. A. Snow & Co.
Attorneys

UNITED STATES PATENT OFFICE.

ANNIE E. BRAY, OF LOS GATOS, CALIFORNIA.

CLAMP.

1,083,482.  Specification of Letters Patent.  Patented Jan. 6, 1914.

Application filed March 5, 1913. Serial No. 752,198.

*To all whom it may concern:*

Be it known that I, ANNIE E. BRAY, a citizen of the United States, residing at Los Gatos, in the county of Santa Clara and State of California, have invented a new and useful Clamp, of which the following is a specification.

This invention relates to a clamp adapted to securely hold the lid upon a fruit jar or similar vessel.

An object of the present invention is to provide a clamp which is of simple construction and one which may be easily and cheaply manufactured.

A further object is to provide a clamp adapted to engage a beveled surface formed upon the mouth of a jar and to force the jar lid against the mouth of the bottle or jar and to hold the same securely in the said position.

A further object is to provide a clamp which may be held in an open position and installed upon the mouth of a vessel and upon the releasing of a spring the clamp will immediately grip the sides of the mouth of the vessel and hold the lid in a closed position.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which:—

Figure 1 is a cross sectional view of a fruit jar to which my improved clamp has been secured. Fig. 2 is a perspective view of my improved clamp. Fig. 3 is a perspective view of a modified form of clamping plate.

Referring to the drawings in which similar reference numerals designate corresponding parts throughout the several views, 1 represents a fruit jar with the mouth 2 projecting thereabove. The said mouth is provided with the beveled or frusto-conical surface 3, to the surface of which my improved clamp is adapted to engage. The lid 4 has been illustrated for sealing the mouth of the vessel and is provided with a gasket 5 lying between the said lid and the upper surface of the mouth 2.

In order to hold the said lid 4 securely in position I have provided a clamp such as illustrated in Fig. 2, comprising the flat plates 6 and 7 to the outer extremities of which plates are formed depending flanges 8 and 9, the said flanges being arcuated as shown in order to conform with the circular outline of the mouth of the vessel. At the lower extremity of the flanges 8 and 9 are the inwardly extending ledges 10 and 11 which are adapted to contact with and wedgedly engage the beveled or frusto-conical surfaces 3 formed upon the mouth of the vessel. In order that the plates 6 and 7 may be forcibly held together which action will tend to drive the said ledges 10 and 11 downwardly upon the beveled surfaces 3, a suitable spring coil 12 is provided and is formed with the arms 13 and 14 radiating therefrom, the said arms being formed at their outer extremity with the gripping portions 15 by which a suitable finger hold is provided.

The flat plate 6 is bifurcated as shown in Fig. 2 and to the projecting arms 16 and 17 thereof are secured the guide plates 18 and 19 securely held thereto by the rivets 20 or other equivalent means. The plate 7 is formed with the arm 21 extending centrally therefrom, the said arm extending between the guide plates 18 and 19 and disposed between the bifurcated portions 16 and 17 of the plate 6. The extremities of the arms 16, 17, and 21 of the plates 6 and 7 are provided with the curled portions 22, 23 and 24 respectively, through the center of which cylindrical or curled portions extend the arms 13 and 14 of the spring, the said spring being one which is adapted to force the said arms 13 and 14 thereof apart, which action will tend to force the ledges 10 and 11 into engagement with the portions 3 of the jar as before mentioned.

In order that the two plates 6 and 7 may be held in an open or spaced position, a suitable ledge 25 is provided and is adapted to engage the arm 14 of the spring coil 12 and to hold the latter in such a manner that the force of the spring will not be exerted upon the curled portion 24 of the plate 7 but will be taken up by the said ledge 25. By the so forming of the said ledge, the finger grips 15 may be engaged and the spring arm 14 positioned behind the ledge 25 as illustrated in Fig. 2. In so doing the plates 6 and 7 will tend to remain in an open position and the clamp may then be suitably inserted upon a bottle or jar and the ledges 10 and 11 brought adjacent the frusto-conical or beveled surface 3 of the said fruit jar. By now raising the arm 14 of the spring coil above the ledge 25 the arms 13 and 14 of the spring coil will immediately tend to spring apart, which action will tend to force the ledges 10 and 11 into engagement with the beveled surface. By reason of the fact that the surface 3 is suitably beveled the clamp will tend to be driven downwardly toward the smaller end of said beveled surface which will bring the lower surfaces of the plates 6 and 7 into forcible contact with the lid 4 to thereby hold the said lid in a closed position and forced against the upper surface of the bottle mouth.

The modification illustrated in Fig. 3 shows a construction of attaching or holding plate in which the clamp is adapted to engage the beveled portion of the jar mouth at more than one point with the result that a lighter and more efficient structure is obtained.

It is to be noted that the clutch herein described is to be used in connection with my patented fruit jar which in the present instance is modified to the extent of providing the mouth with a bevel.

From the foregoing it will be apparent that my improved clamp may be put to a variety of uses and that a clamp has been devised which is extremely simple in construction and one which is easy to install in position upon a bottle or remove therefrom.

Having thus fully described the construction and operation of my improved clamp, what I claim to be new and original with me is:—

1. In a device of the class described, a flat plate with a flange depending therefrom, an arm extending centrally from said plate, a flat plate provided with a bifurcated end portion, a flange formed at the remote end of said last mentioned plate, the bifurcation of said plate and said centrally extending arm interengaging, resilient means secured to said plates adapted to force the same together, ledges formed at the lower portion of said flanges adapted to engage the beveled surface of a jar mouth.

2. The combination with a jar provided with a beveled mouth, a lid for said jar, a clamp comprising two plates resiliently forced together, said plates provided with flanges depending therefrom, said flanges provided with ledges extending therefrom, said ledges adapted to engage the said beveled portion of the jar mouth, said plates adapted to engage the said cover to secure the cover against the jar mouth.

3. In a device of the class described, a plate, provided with an arm extending centrally therefrom, a second plate one end of which is bifurcated and adapted to embrace the said arm, guide plates secured to the upper and lower surface of said bifurcated portion adapted to limit said arm to a longitudinal sliding movement, said plates provided with flanges depending therefrom, said flanges provided at their lower portion with ledges adapted to engage the beveled portion of a jar mouth, said plate arm provided with a curled portion at its extremity, said bifurcated portions of said plate provided with curled portions at their extremities, a spring extending through said curled portions adapted to force said plates together.

4. In a device of the class described, a plate provided with an arm extending centrally therefrom, a second plate provided with a bifurcated end, the ends of said arm and said bifurcations provided with curled portions, guide plates secured to the upper and lower surface of said bifurcated end adapted to slidably engage said arm to limit the same to a longitudinal sliding movement, a spring provided with arms depending therefrom, said spring arms extending through said curled portions adapted to force said plates together, said bifurcated plate provided with a ledge extending upwardly therefrom adapted to hold said spring in a closed position, said plate provided with flanges depending therefrom at the outer edges thereof, said flanges provided with ledges extending inwardly therefrom adapted to engage the beveled portion of a jar mouth.

In testimony that I claim the foregoing as my own, I have hereto affixed my signature in the presence of two witnesses.

ANNIE E. BRAY.

Witnesses:
HELEN G. GIBSON,
R. R. BELL.

---

Copies of this patent may be obtained for five cents each, by addressing the "Commissioner of Patents, Washington, D. C."